(12) United States Patent
Werris

(10) Patent No.: US 10,796,233 B2
(45) Date of Patent: Oct. 6, 2020

(54) SYSTEMS AND METHODS FOR SUGGESTING CONTENT

(71) Applicant: Facebook, Inc., Menlo Park, CA (US)

(72) Inventor: Ian Werris, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 706 days.

(21) Appl. No.: 15/289,781

(22) Filed: Oct. 10, 2016

(65) Prior Publication Data
US 2018/0101774 A1     Apr. 12, 2018

(51) Int. Cl.
| | | |
|---|---|---|
| G06N 5/04 | (2006.01) | |
| G06N 99/00 | (2019.01) | |
| H04L 29/08 | (2006.01) | |
| G06N 20/00 | (2019.01) | |
| H04W 4/80 | (2018.01) | |

(52) U.S. Cl.
CPC ............... *G06N 5/04* (2013.01); *G06N 20/00* (2019.01); *H04L 67/306* (2013.01); *H04W 4/80* (2018.02)

(58) Field of Classification Search
CPC ........... H04W 4/80; G06N 20/00; G06N 5/04; H04L 67/306
USPC .......................................................... 706/12
See application file for complete search history.

(56) References Cited

U.S. PATENT DOCUMENTS

| | | | | |
|---|---|---|---|---|
| 2014/0270547 A1* | 9/2014 | Dwan | ................ | G06K 9/00684 382/224 |
| 2015/0341297 A1* | 11/2015 | Barfield, Jr. | ............ | H04L 51/32 709/206 |
| 2016/0179769 A1* | 6/2016 | Gershom | ................ | G06F 16/23 715/235 |
| 2016/0255163 A1* | 9/2016 | Stathacopoulos | ....... | H04L 51/14 709/224 |
| 2016/0323398 A1* | 11/2016 | Guo | ...................... | G06F 16/335 |
| 2016/0350658 A1* | 12/2016 | Kedia | ...................... | G06N 5/04 |
| 2017/0140249 A1* | 5/2017 | Lee | .................... | G06K 9/00677 |

* cited by examiner

*Primary Examiner* — Kuen S Lu
(74) *Attorney, Agent, or Firm* — Sheppard Mullin Richter & Hampton LLP

(57) ABSTRACT

Systems, methods, and non-transitory computer-readable media can train a machine learning model to output respective scores for content items based at least in part on information describing a user, wherein a score for a content item measures a likelihood that the user will select the content item to be included in a social profile of the user. A determination is made that a first user of the social networking system is eligible for a content item suggestion. A first content item to be provided as a suggestion to the first user is determined based at least in part on the model. The first content item is provided as a suggestion to the first user for use in a social profile of the first user.

19 Claims, 7 Drawing Sheets

SYSTEMS AND METHODS FOR SUGGESTING CONTENT

FIELD OF THE INVENTION

The present technology relates to the field of content suggestion. More particularly, the present technology relates to techniques for suggesting images to users.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

SUMMARY

Various embodiments of the present disclosure can include systems, methods, and non-transitory computer readable media configured to train a machine learning model to output respective scores for content items based at least in part on information describing a user, wherein a score for a content item measures a likelihood that the user will select the content item to be included in a social profile of the user. A determination is made that a first user of the social networking system is eligible for a content item suggestion. A first content item to be provided as a suggestion to the first user is determined based at least in part on the model. The first content item is provided as a suggestion to the first user for use in a social profile of the first user.

In an embodiment, the systems, methods, and non-transitory computer readable media are configured to determine that the first user has not selected a cover photo for use in the social profile of the first user.

In an embodiment, the systems, methods, and non-transitory computer readable media are configured to determine that the first user has uploaded a content item to the social networking system.

In an embodiment, the systems, methods, and non-transitory computer readable media are configured to generate a set of training examples that each include information describing a user and a corresponding set of features that describe a cover photo being used in a social profile of the user.

In an embodiment, the systems, methods, and non-transitory computer readable media are configured to determine one or more sets of words that describe a user from content that was published by the user through the social networking system.

In an embodiment, the systems, methods, and non-transitory computer readable media are configured to extract at least one noun, verb, or concept from the content that was published by the user.

In an embodiment, the systems, methods, and non-transitory computer readable media are configured to determine one or more sets of words that describe a user from images that are associated with the user in the social networking system.

In an embodiment, the systems, methods, and non-transitory computer readable media are configured to determine respective scores for a set of content items based at least in part on the model, wherein the set of content items includes the first content item and determine that the first content item has a highest score among the set of content items.

In an embodiment, the scores are adjusted based at least in part on a temporal degradation function.

In an embodiment, the set of content items includes content items that were uploaded to the social networking system by the first user.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
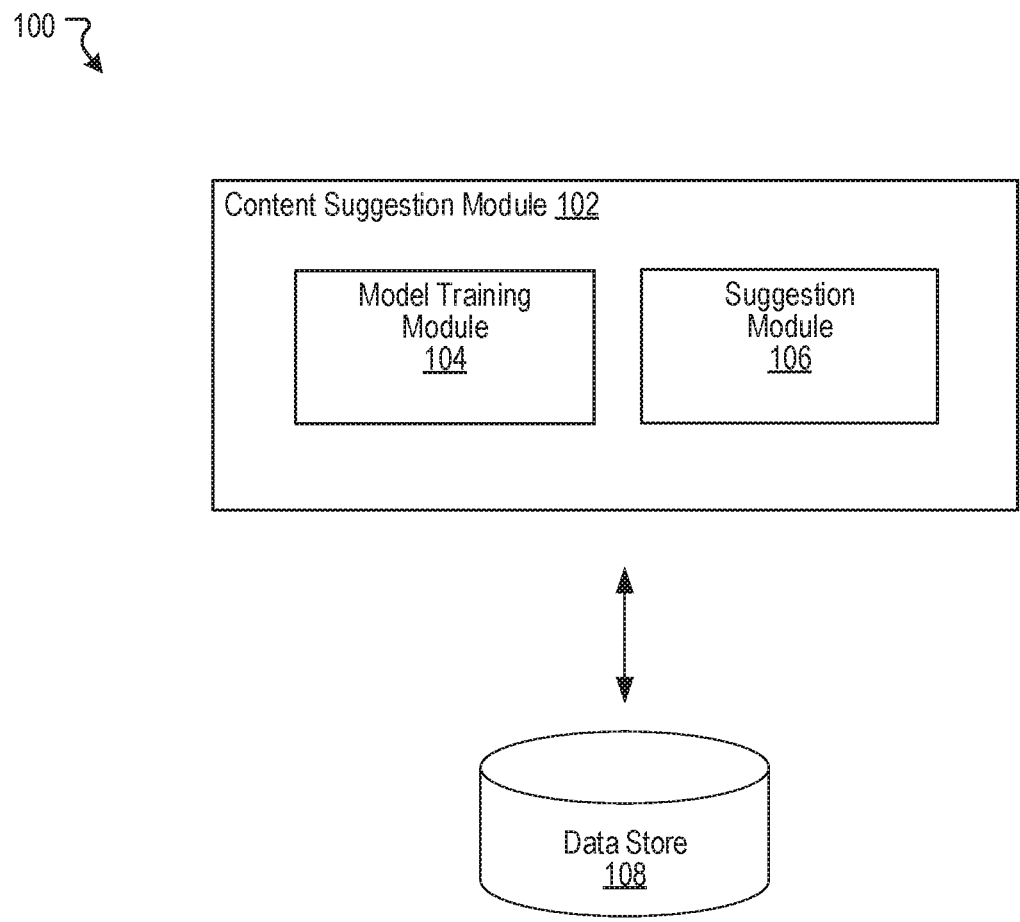
FIG. 1 illustrates an example system including an example content suggestion module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Suggesting Content

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others. Under conventional approaches, a user can sign-up to create a social profile that is published through a social networking system. The social profile can include various information about the user as well as any images that were provided by the user. The social profile can also name any organized groups in the social networking system to which the user belongs or of which the user is a fan.

When configuring the social profile, the user can provide an image to be used as a profile picture. This profile picture can be shown along with the user's name throughout the social networking system, as appropriate. For example, the user's profile picture and name can be shown next to a post or comment that was published by the user through the social networking system. In some instances, the user can further customize the social profile by providing an image to be used as a cover photo. The cover photo can be shown in the user's social profile. For example, the cover photo may be included as a large image at the top of the user's social profile page. In contrast to the profile picture, the cover photo may be used, for example, to express something about the user or something that is of interest to the user. For example, the user may set the cover photo to an image of hot air balloons, an image of an idyllic countryside, or an image of the user snowboarding. In many instances, users will regularly update their cover photos to keep their social profiles fresh and representative of subject matter that is of interest to the user. Some users, however, may not update their cover photos as often. In some instances, infrequent updates to the user's social profile, including cover photo updates, may result in the user's social profile being perceived by other users as stale or uninteresting, and this result may negatively affect engagement among users. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, a model can be trained to analyze various images to determine which of the images are the best candidates to be used as a user's cover photo. The images analyzed may include any images that are associated with the user (e.g., the user's uploaded images, images in which the user was tagged, links to images posted by the user, etc.) or any image available for public use (e.g., stock photos). The model can be trained using information that is extracted from social profiles of users including, for example, content posted by a user, any groups associated with the user, images uploaded by the user, and the user's existing cover photo. Once trained, the model can be provided data describing various images as input and the model can output respective scores for the images that are user specific. The best scoring image can be provided to the user as a suggestion for use as a cover photo or replacing an existing cover photo.

FIG. 1 illustrates an example system 100 including an example content suggestion module 102, according to an embodiment of the present disclosure. As shown in the example of FIG. 1, the content suggestion module 102 can include a model training module 104 and a suggestion module 106. In some instances, the example system 100 can include at least one data store 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the content suggestion module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content suggestion module 102 can be implemented, in part or in whole, as software running on one or more computing devices or systems, such as on a user or client computing device. In one example, the content suggestion module 102 or at least a portion thereof can be implemented as or within an application (e.g., app), a program, or an applet, etc., running on a user computing device or a client computing system, such as the user device 610 of FIG. 6. In another example, the content suggestion module 102 or at least a portion thereof can be implemented using one or more computing devices or systems that include one or more servers, such as network servers or cloud servers. In some instances, the content suggestion module 102 can, in part or in whole, be implemented within or configured to operate in conjunction with a social networking system (or service), such as the social networking system 630 of FIG. 6.

The content suggestion module 102 can be configured to communicate and/or operate with the at least one data store 108, as shown in the example system 100. The at least one data store 108 can be configured to store and maintain various types of data. For example, the data store 108 can store information describing user social profiles published through the social networking system as well as data related to individual user social profiles (e.g., user posts, comments, groups, images, etc.). In some implementations, the at least one data store 108 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data.

Figure 6:
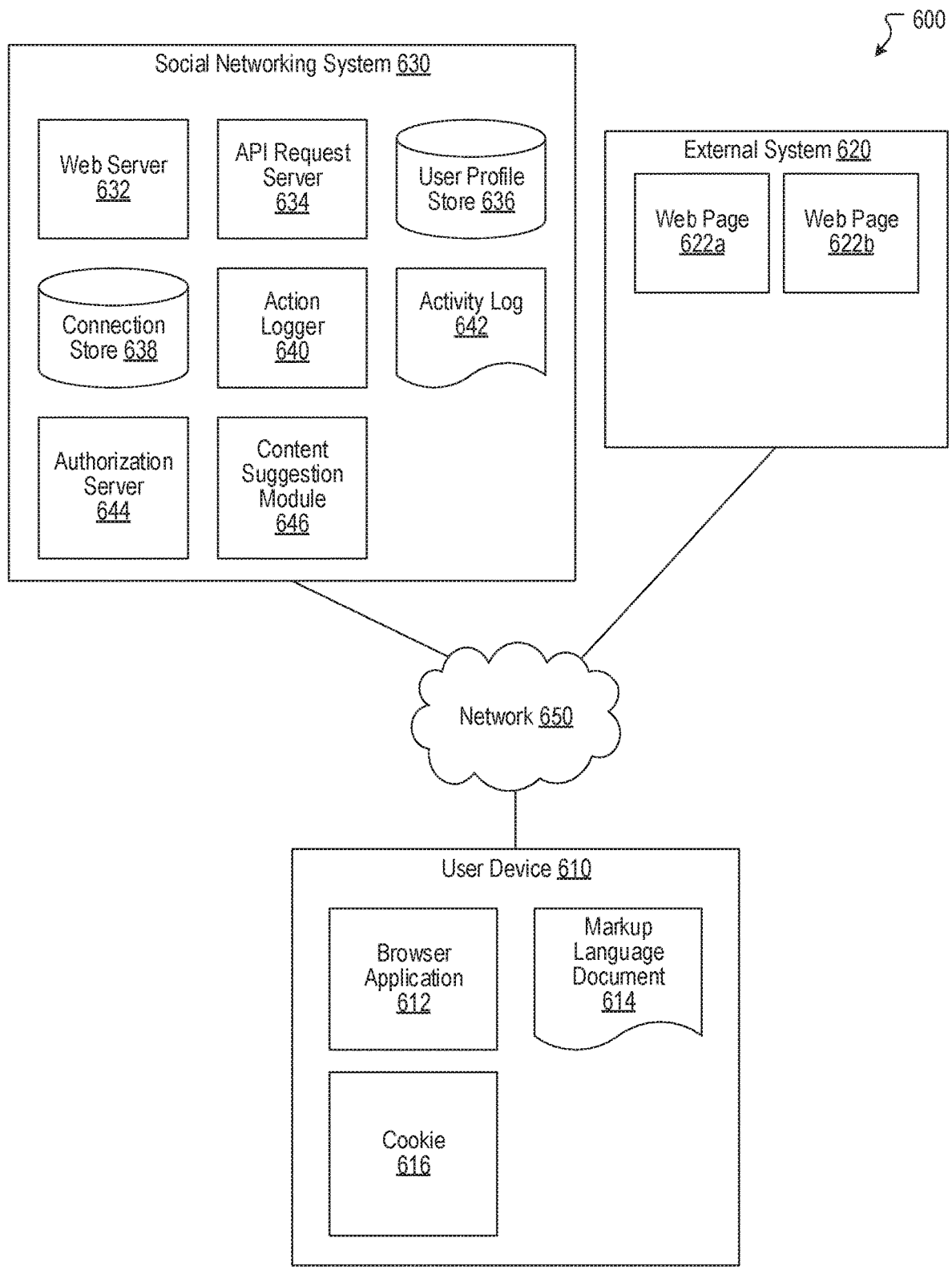
FIG. 6 illustrates a network diagram of an example system including an example social networking system that can be utilized in various scenarios, according to an embodiment of the present disclosure.

As mentioned, the content suggestion module 102 can, in part or in whole, be implemented within or configured to operate in conjunction with a social networking system (or service), such as the social networking system 630 of FIG. 6. In various embodiments, the content suggestion module 102 can be configured to train and utilize a model for recommending content to users of the social networking system for use in their respective social profiles. In some embodiments, the model training module 104 can train the model using information that is extracted from social profiles of users including, for example, content posted by a user, any groups associated with the user, images associated with the user, and the user's existing cover photo. More details regarding the model training module 104 will be provided below with reference to FIG. 2. Once the model is trained, the suggestion module 106 can be used to recommend content to users for use in their respective social profiles. More details regarding the suggestion module 106 will be provided below with reference to FIG. 3.

Figure 2:
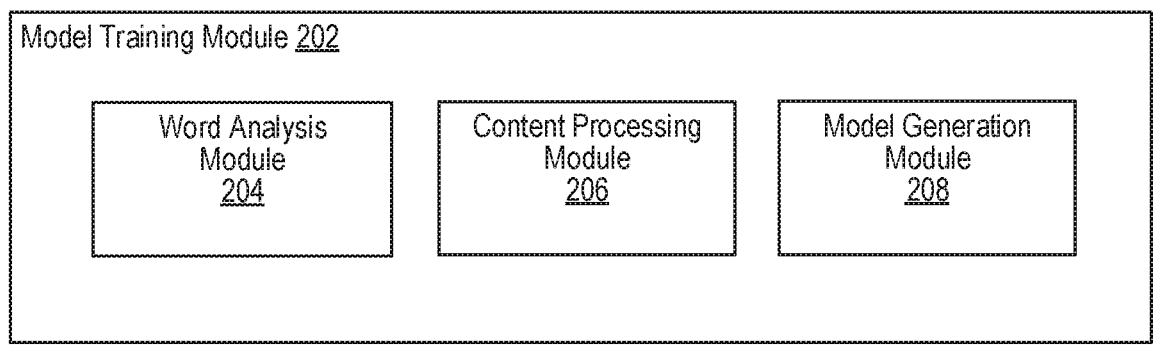
FIG. 2 illustrates an example model training module, according to an embodiment of the present disclosure.

FIG. 2 illustrates an example of a model training module 202, according to an embodiment of the present disclosure. In some embodiments, the model training module 104 of FIG. 1 can be implemented as the model training module 202. As shown in FIG. 2, the model training module 202 can include a word analysis module 204, a content processing module 206, and a model generation module 208.

In various embodiments, the model training module 202 can be configured to train a model using information extracted from user social profiles that are published through the social networking system. In some embodiments, the training examples used to generate the model include, for some or all users of the social networking system, one or more sets of words (e.g., word vectors) that describe the user's interests and/or characteristics along with a corresponding set of features that describe the user's selected cover photo at the time. As described below, the model is trained to learn how the inputs, e.g., the sets of words generated for a given user, relate to the user's selected cover photo. Once trained, the model can be used to predict respective scores for content items (e.g., images, videos, audio, etc.). In some embodiments, such scores may be used to identify images that are eligible for use as a user's cover photo. For example, the image having the highest score can be provided as a suggestion to the user for use as their cover photo.

In some embodiments, the word analysis module 204 can determine a set of words from posts that were published by the user through the social networking system. For example, the user can interact with the social networking system through an interface that is provided by a software application (e.g., a social networking application) running on a computing device of the user. The user can post content to be published through the social networking system. Such posts may include text and media content items, such as images, videos, and audio. A post may be designated as being public or private. In general, public posts that are published through the social network can be consumed (e.g., viewed, accessed, etc.) by any other user of the social networking system. In contrast, private posts that are published through the social network can be restricted to a certain user or group of users as specified by the poster.

Content that is associated with the user (e.g., posts, comments, group titles and/or descriptions, etc.) can be analyzed using generally known natural language processing techniques to identify key words or terms such as nouns, verbs, and/or concepts, that are in the content. Thus, for example, posts of the user can be analyzed to identify any nouns, verbs, and/or concepts that are in the user's posts. Any nouns, verbs, and/or concepts that are extracted from the content can be included in the set of words. In one example, the user may have posted about a triathlon event that involves swimming, bicycling, and running. In a separate post, the user may have posted about stopping at a café while on a bike ride. In this example, the set of words (e.g., nouns, verbs, and/or concepts) may include "swimming", "bicycling", "running", and "café" which were determined from content associated with the user.

In some embodiments, respective weights can be assigned to words in the set based on the word's frequency or importance. One example approach for determining such weights is term frequency-inverse document frequency or tf-idf. For example, if the terms "swimming", "bicycling", and "running" were extracted from a user's first post and the terms "bicycling" and "café" were extracted from the user's second post, then the set of words would comprise "swimming", "bicycling", "running" and "café". Assuming that only the first post and the second post are under consideration, then there is one instance of the term "swimming", two instances of the term "bicycling", one instance of the term "running", and one instance of the term "café". In this example, the set of words can be normalized, or weighted, as follows: "swimming" is assigned a weight of 0.2, "bicycling" is assigned a weight of 0.4, "running" is assigned a weight of 0.2, and "ice cream" is assigned a weight of 0.2. In some embodiments, such weighting is done for words extracted from all of the content associated with the user. In some embodiments, such weighting is done for words extracted from content that was created by the user over some specified period of time (e.g., a time interval, the last n days, months, years, etc.).

In some embodiments, the word analysis module 204 can determine a set of words based on the user's comments. For example, the user can post comments in response to content that has been published through the social networking system. Similarly, comments may be deemed to be public or privately available. In general, a comment posted by the user can be treated as being a private comment or public comment depending on whether the content item (e.g., post) for which the comment was posted was designated as being private or public. The word analysis module 204 can determine the set of words based on the user's comments using the same techniques that were used to determine the set of words based on the user's posts, as described above. This set of words can also be weighted, for example, using the approaches described above. In some embodiments, the sets of words are determined from the user's publically available content, e.g., public posts and public comments.

In some embodiments, the word analysis module 204 can determine a set of words based on the groups associated with the user. In general, a user can join a group through the social networking system to connect with specific sets of people, e.g., family, teammates, coworkers, other users that share interests and/or characteristics. A group is typically associated with a page that is accessible through the social networking system. The group page can include various information such as the name of the group and a description of the group, for example. The user can select an option to join the group through the social networking system. Members of the group can discuss and share content through the group page. The word analysis module 204 can determine a set of words based on the user's groups. For example, the word analysis module 204 can extract any nouns, verbs, and/or concepts from pages of groups with which the user is associated. Thus, for example, the word analysis module 204 can extract nouns, verbs, and/or concepts from the group title and/or group description. This extracted information can be used to determine the set of words, as described above. This set of words can also be weighted, for example, using the approaches described above. In some embodiments, a set of words can be determined from any content that is associated with the user and is not limited to information that may be obtained through the social networking system.

In various embodiments, the content processing module 206 can be configured to determine a set of words from images that are associated with the user. Such images can include, for example, various images that were uploaded by the user, images in which the user was tagged, links to images that were posted by the user, etc. In various embodiments, to generate a set of words from the user's images, the content processing module 206 can perform a classification analysis on the images to determine the subject matter that is reflected in the images. In some embodiments, the content processing module 206 can perform the classification analysis by applying a machine learning model (content classifier) to an image. In particular, the content processing module 206 can determine a probability regarding whether the image reflects predetermined subject matter (e.g., identities, or names, of individuals, objects, activities, products, logos, animals, points of interest, or other concepts). The content classifier can be based on any machine learning technique, including but not limited to a deep convolutional neural network. The content classifier supported by the content processing module 206 can be trained and tested to determine the subject matter reflected in an image. In a development phase, contextual cues for a sample set of images can be gathered. Images classes corresponding to various subject matter can be determined. Correlation of the sample set of images with the image classes based on the contextual cues can be determined. A training set of images can be generated from the sample set of images based on scores indicative of high correlation. The training set of images can be used to train the content classifier to generate visual pattern templates of the image classes. In an evaluation phase, the content classifier can be applied to a new image to determine the subject matter reflected in the new image.

In some embodiments, upon processing an input image, the content classifier outputs a set of features that correspond to the subject matter reflected in the inputted image. For each feature, the content classifier can also output a respective probability indicating a likelihood that the feature was found in the subject matter reflected by the inputted image. In some embodiments, features that satisfy predetermined thresholds can be included in the set of words that correspond to the inputted image. These predetermined thresholds may be baseline likelihoods that need to be satisfied before a feature is determined to exist in an image. Once determined, the set of words can be weighted using the approaches described above. For example, assuming that only a first image and a second image are associated with a user with the first image capturing a scene of the user bicycling across the Golden Gate Bridge and the second image capturing a scene of the user running on the Golden Gate Bridge. For the first image, the content classifier may output the features "bicycling", "Golden Gate Bridge", and a feature corresponding to the user's identity. For the second image, the content classifier may output the features "running", "Golden Gate Bridge", and a feature corresponding to the user's identity. In this example, there is one instance of the term "bicycling", two instances of the term "Golden Gate Bridge", one instance of the term "running", and two instances of the feature referencing the user's identity. Assuming all of the outputted features satisfy their respective thresholds, the set of words determined from the user's images can be weighted as follows: "bicycling" is assigned a weight of 0.16, "Golden Gate Bridge" is assigned a weight of 0.33, "running" is assigned a weight of 0.16, and the feature referencing the user's identity is assigned a weight of 0.33.

The content processing module 206 can also utilize the content classifier to determine a set of features corresponding to a cover photo image being used by a user. That is, the content classifier can process the cover photo to output a set of features that correspond to the subject matter reflected in the cover photo. In some embodiments, the content classifier can determine a set of features using any cover photo that has previously been used by the user.

Using the approaches above, the model generation module 208 can generate a set of training examples. In some embodiments, a training example includes one or more sets of words determined from content associated with a user (e.g., the user's posts, comments, groups, and images) along with a corresponding set of features that describe the user's selected cover photo. A number of different training examples can be generated from data corresponding to some, or all, users of the social networking system. The model generation module 208 can use these training examples to generate a model (e.g., a neural network) for suggesting content to users. The model is trained to learn how the inputs, e.g., the sets of words determined from the content and images associated with a user, relate to the user's selected cover photo. In some embodiments, for any user, this model can be used to determine respective scores for images that are eligible for use as the user's cover photo. In such embodiments, a score for an image measures a likelihood that the image will be used by the user as a cover photo.

Figure 3:
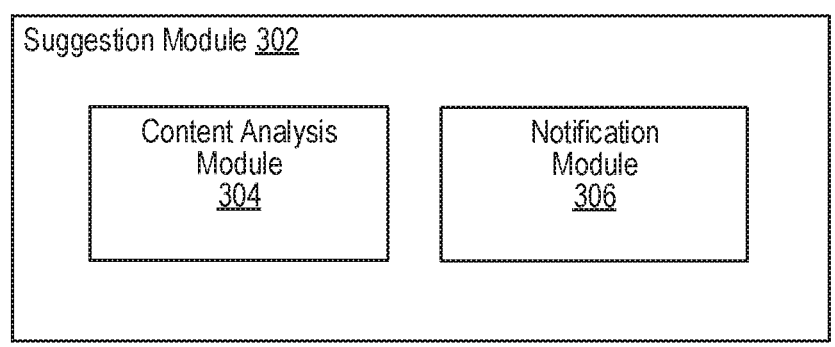
FIG. 3 illustrates an example suggestion module, according to an embodiment of the present disclosure.

FIG. 3 illustrates an example suggestion module 302, according to an embodiment of the present disclosure. In some embodiments, the suggestion module 106 of FIG. 1 can be implemented as the suggestion module 302. As shown in FIG. 3, the suggestion module 302 can include a content analysis module 304 and a notification module 306. The content analysis module 304 can be configured to analyze content, e.g., images, using the model that was generated by the model training module 202 of FIG. 2 to identify images that can be recommended to a user for use as a cover photo.

In some embodiments, the content analysis module 304 can determine, for a user that does not have a cover photo, respective scores for a set of images that are eligible for use as the user's cover photo. The set of images can include any images that are associated with the user (e.g., images uploaded by the user, images in which the user was tagged, links to images posted by the user, etc.) as well as any images that are available for public use (e.g., stock photos). The content analysis module 304 can provide the sets of words determined from content associated with the user, as described above, along with each image to the model to obtain a score for the image. In some embodiments, when providing the image to the model, the content analysis module 304 determines a set of features corresponding to the image and provides the set of features to the model. The set of features for the image can be determined, for example, using the content classifier that is utilized by the content processing module 206 of FIG. 2. In response, the model outputs a score for the image.

Once scores for the set of images have been determined, the content analysis module 304 can rank images in the set based on their respective scores. In some embodiments, the notification module 306 can provide the image having the highest score as a suggestion to the user for use as a cover photo. In some embodiments, the notification module 306 can provide more than one image (e.g., two images, three images, etc.) that have the highest scores in the set as suggestions to the user. In some embodiments, an image suggestion can be provided to the user if the user has not updated their cover photo for a specified period of time (e.g., a specified number of days, months, years, etc.). In some embodiments, the scores generated for the set of images are scaled using a temporal degradation function. The temporal degradation function can help prevent stale, or cover photos that were previously used by a user, from being recommended to the user for use as cover photos. In some embodiments, temporal degradation is also applied to the corresponding likelihoods of any sets of features determined for content items, for example, using the content classifier, as described above.

In some embodiments, the content analysis module 304 can analyze content in real-time. For example, the content analysis module 304 can analyze a content item (e.g., image) when a user uploads the content item to the social networking system, when the user is tagged in a content item, when the user posts a link to a content item, when the user likes a content item, and/or when the user comments in a content item, to name some examples. In such embodiments, such content items can be scored, as described above, and the notification module 306 can suggest the content item to the user, for example, for use as their cover photo as appropriate. In some embodiments, the content item is provided as a suggestion if the score for the content item satisfies a threshold value.

The approaches described above are not limited to providing images as suggestions for use as cover photos and, naturally, these approaches can be adapted for recommending, or suggesting, any type of content item including, for example, videos and audio. In some embodiments, users that are associated with a particular product, logo, and/or brand can be identified using the techniques above. For example, images posted by a user may include subject matter that corresponds to a product logo. In this example, this user may be provided a suggestion to update their cover photo to correspond to a specific content item (e.g., an image of the product logo) in exchange for a benefit, monetary or otherwise. To accept the offer, the user can update the cover photo for some specified period of time.

Figure 4:
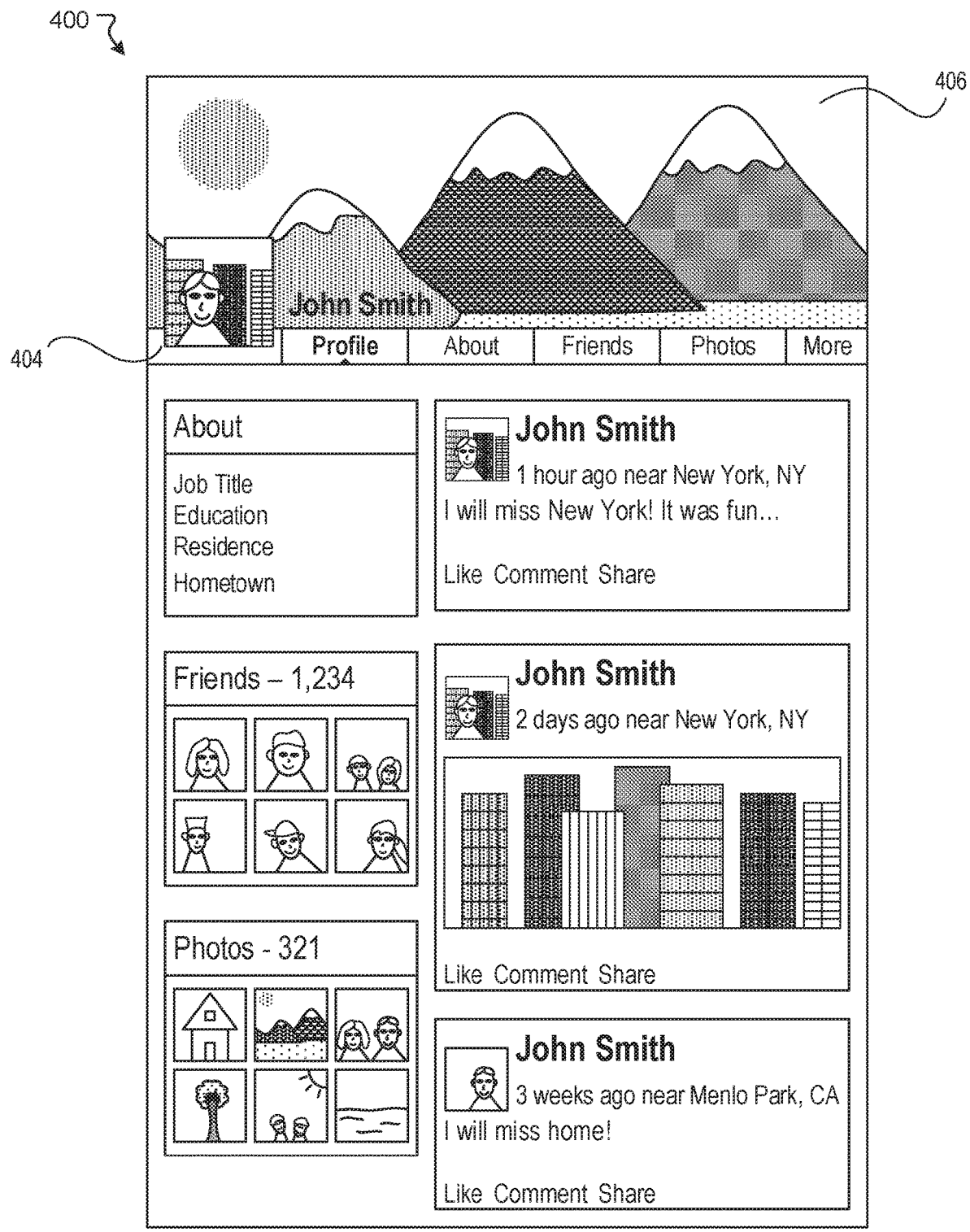
FIG. 4 illustrates an example social profile page, according to various embodiments of the present disclosure.

FIG. 4 illustrates an example social profile page 400, according to various embodiments of the present disclosure. The social profile page 400 belongs to a user John Smith of a social networking system (e.g., the social networking system 630 of FIG. 6). As shown in FIG. 4, the user has selected a profile picture 404 to be displayed in the social profile page 400. Similarly, the user has selected a cover photo 406 to be displayed in the social profile page 400. In various embodiments, the social networking system can provide suggestions for updating the cover photo 406 using the approaches described above.

Figure 5:
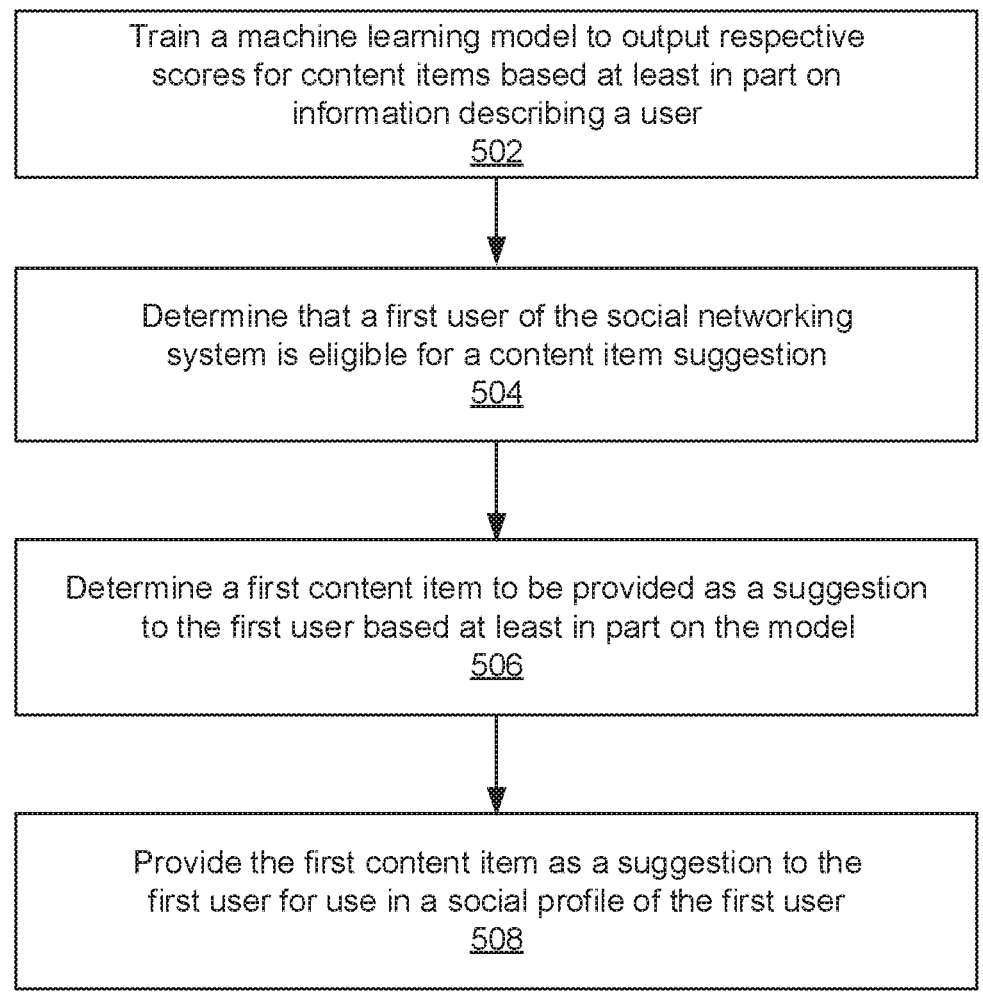
FIG. 5 illustrates an example process for suggesting content, according to various embodiments of the present disclosure.

FIG. 5 illustrates an example process 500 for suggesting content, according to various embodiments of the present disclosure. It should be appreciated that there can be additional, fewer, or alternative steps performed in similar or alternative orders, or in parallel, within the scope of the various embodiments discussed herein unless otherwise stated.

At block 502, a machine learning model to output respective scores for content items based at least in part on information describing a user is trained. A score for a content item measures a likelihood that the user will select the content item to be included in a social profile of the user. At block 504, a determination is made that a first user of the social networking system is eligible for a content item suggestion. At block 506, a first content item to be provided as a suggestion to the first user is determined based at least in part on the model. At block 508, the first content item is provided as a suggestion to the first user for use in a social profile of the first user.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622*a*, 622*b*, which are communicated to the user device 610 using the network 650. The external system 620 is separate from the social networking system 630. For example, the external system 620 is associated with a first domain, while the social networking system 630 is associated with a separate social networking domain. Web pages 622*a*, 622*b*, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content suggestion module 646. The content suggestion module 646 can, for example, be implemented as the content suggestion module 102 of FIG. 1. As discussed previously, it should be appreciated that there can be many variations or other possibilities.

Hardware Implementation

Figure 7:
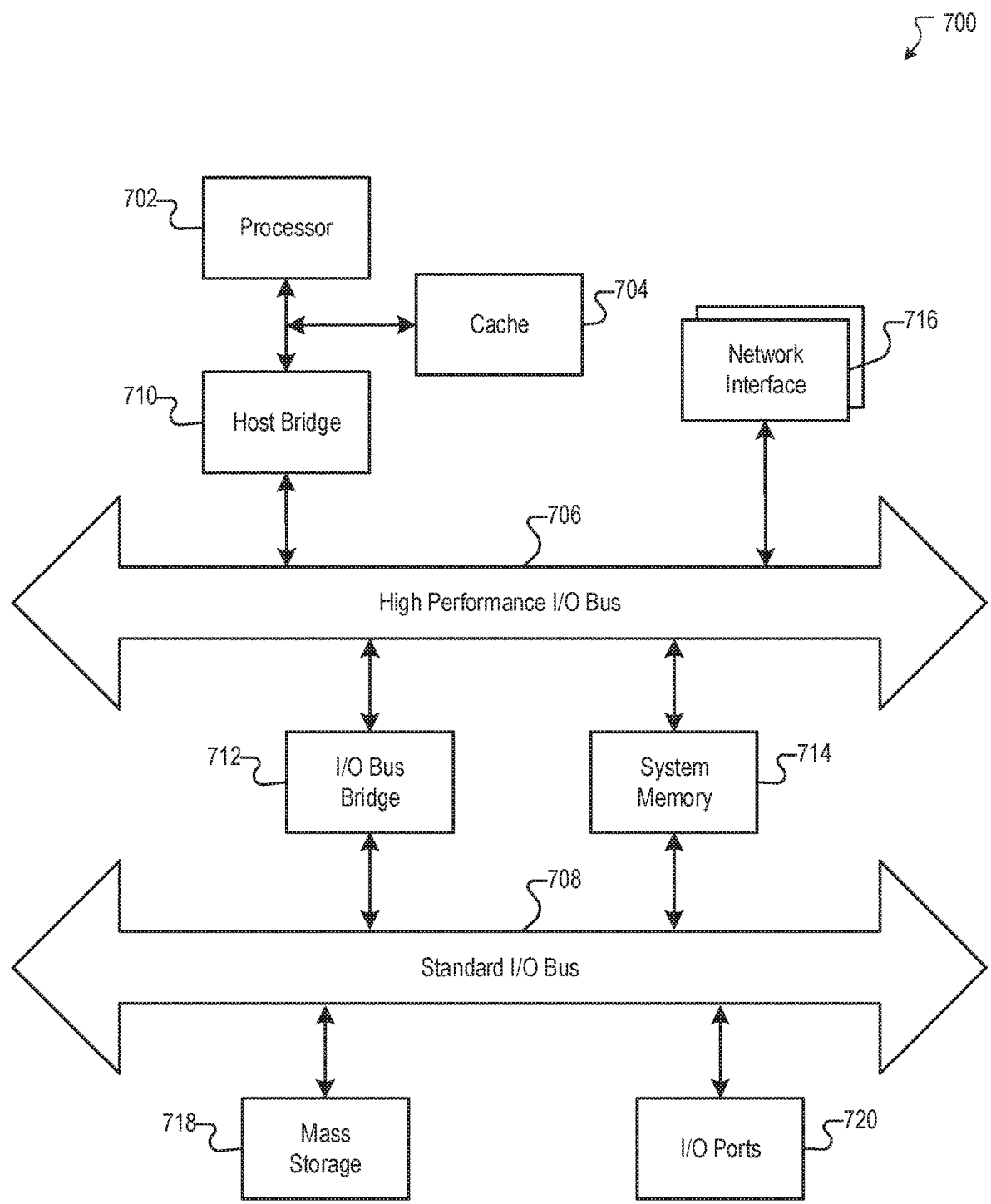
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    determining, by a social networking system, that a user of the social networking system is eligible for a cover photo suggestion;
    providing, by the social networking system, a set of images associated with the user and one or more sets of words determined from content associated with the user along with each image as input to a machine learning model, wherein the content includes at least one of posts, comments, or groups of the user;
    obtaining, by the social networking system, respective scores for the set of images as output of the machine learning model, wherein a score for a corresponding image measures a likelihood that the user selects the corresponding image as a cover photo in a social profile of the user; and
    selecting, by the social networking system, among the set of images, an image having the highest score as a cover photo suggestion for use in a social profile of the user.

2. The computer-implemented method of claim 1, wherein determining that the user of the social networking system is eligible for a cover photo suggestion further comprises:
    determining, by the social networking system, that the user has not selected a cover photo for use in the social profile of the user.

3. The computer-implemented method of claim 1, wherein determining that the user of the social networking system is eligible for a cover photo suggestion further comprises:
    determining, by the social networking system, that the user has uploaded an image to the social networking system.

4. The computer-implemented method of claim 1, further comprising:
    generating, by the social networking system, a set of training examples to train the model, wherein each training example includes information describing a user and a corresponding set of features that describe a cover photo being used in a social profile of the user.

5. The computer-implemented method of claim 4, wherein generating the set of training examples further comprises:
    determining, by the social networking system, one or more sets of words that describe a user from content that was published by the user through the social networking system.

6. The computer-implemented method of claim 5, wherein determining the one or more sets of words further comprises:
    extracting, by the social networking system, at least one noun, verb, or concept from the content that was published by the user.

7. The computer-implemented method of claim 4, wherein generating the set of training examples further comprises:
    determining, by the social networking system, one or more sets of words that describe a user from images that are associated with the user in the social networking system.

8. The computer-implemented method of claim 1, wherein the respective scores are adjusted based at least in part on a temporal degradation function.

9. The computer-implemented method of claim 1, wherein the set of images includes images uploaded to the social networking system by the user.

10. A system comprising:
    at least one processor; and
    a memory storing instructions that, when executed by the at least one processor, cause the system to perform:
        determining that a user of the social networking system is eligible for a cover photo suggestion;
        providing a set of images associated with the user and one or more sets of words determined from content associated with the user along with each image as input to a machine learning model, wherein the content includes at least one of posts, comments, or groups of the user;

obtaining respective scores for the set of images as output of the machine learning model, wherein a score for a corresponding image measures a likelihood that the user selects the corresponding image as a cover photo in a social profile of the user;

and selecting among the set of images, an image having the highest score as a cover photo suggestion for use in a social profile of the user.

11. The system of claim 10, wherein determining that the user of the social networking system is eligible for a cover photo suggestion further causes the system to perform:

determining that the user has not selected a cover photo for use in the social profile of the user.

12. The system of claim 10, wherein determining that the user of the social networking system is eligible for a cover photo suggestion further causes the system to perform:

determining that the user has uploaded an image to the social networking system.

13. The system of claim 10, wherein the instructions further cause the system to perform:

generating a set of training examples to train the model, wherein each training example includes information describing a user and a corresponding set of features that describe a cover photo being used in a social profile of the user.

14. The system of claim 13, wherein generating the set of training examples further causes the system to perform:

determining one or more sets of words that describe a user from content that was published by the user through the social networking system.

15. A non-transitory computer-readable storage medium including instructions that, when executed by at least one processor of a computing system, cause the computing system to perform a method comprising:

determining that a user of the social networking system is eligible for a cover photo suggestion;

providing a set of images associated with the user and one or more sets of words determined from content associated with the user along with each image as input to a machine learning model, wherein the content includes at least one of posts, comments, or groups of the user as input to a machine learning model;

obtaining respective scores for the set of images as output of the machine learning model, wherein a score for a corresponding image measures a likelihood that the user selects the corresponding image as a cover photo in a social profile of the user; and selecting among the set of images, an image having the highest score as a cover photo suggestion for use in a social profile of the user.

16. The non-transitory computer-readable storage medium of claim 15, wherein determining that the user of the social networking system is eligible for a cover photo suggestion further causes the computing system to perform:

determining that the user has not selected a cover photo for use in the social profile of the user.

17. The non-transitory computer-readable storage medium of claim 15, wherein determining that the user of the social networking system is eligible for a cover photo suggestion further causes the computing system to perform:

determining that the user has uploaded an image to the social networking system.

18. The non-transitory computer-readable storage medium of claim 15, wherein the instructions further cause the computing system to perform:

generating a set of training examples to train the model, wherein each training example includes information describing a user and a corresponding set of features that describe a cover photo being used in a social profile of the user.

19. The non-transitory computer-readable storage medium of claim 15, wherein generating the set of training examples further causes the computing system to perform:

determining one or more sets of words that describe a user from content that was published by the user through the social networking system.

* * * * *